United States Patent
Denholm

(10) Patent No.: US 7,510,628 B2
(45) Date of Patent: Mar. 31, 2009

(54) FIRE RETARDANT PAPER

(75) Inventor: Ann Denholm, Stonyfell (AU)

(73) Assignee: FF Seeley Nominees Pty Ltd., St. Marys (AU)

(*) Notice: Subject to any disclaimer, the term of this patent is extended or adjusted under 35 U.S.C. 154(b) by 365 days.

(21) Appl. No.: 10/566,105

(22) PCT Filed: Jul. 16, 2004

(86) PCT No.: PCT/AU2004/000967

§ 371 (c)(1),
(2), (4) Date: Jan. 26, 2006

(87) PCT Pub. No.: WO2005/012638

PCT Pub. Date: Feb. 10, 2005

(65) Prior Publication Data

US 2007/0082194 A1    Apr. 12, 2007

(30) Foreign Application Priority Data

Jul. 28, 2003  (AU) .............................. 2003903873

(51) Int. Cl.
*D21H 21/34*  (2006.01)
*D21H 17/66*  (2006.01)

(52) U.S. Cl. ................................... 162/159; 162/181.2

(58) Field of Classification Search ................. 162/135, 162/136, 158, 159, 164.1, 166, 181.1, 181.2, 162/184, 160; 428/342, 920, 921; 242/607; 106/15.05, 18.13, 18.14, 18.15, 18.16, 18.17
See application file for complete search history.

(56) References Cited

U.S. PATENT DOCUMENTS

| 2,523,626 | A | * | 9/1950 | Jones, Jr. et al. ............. 527/205 |
| 2,690,393 | A |   | 9/1954 | McGarvey |
| 2,881,088 | A | * | 4/1959 | Schulenburg ............. 427/385.5 |
| 3,257,267 | A | * | 6/1966 | Hay ........................... 162/159 |
| 3,663,267 | A | * | 5/1972 | Moran et al. ................. 428/452 |
| 3,782,475 | A |   | 1/1974 | Schmidt |
| 4,182,681 | A |   | 1/1980 | Gumbert |
| 4,216,136 | A |   | 8/1980 | Stayner |
| 5,723,020 | A |   | 3/1998 | Robinson |

FOREIGN PATENT DOCUMENTS

| GB | 901663 | 7/1962 |
| JP | 54088697 | 7/1979 |
| JP | 2001110550 | 4/2001 |

* cited by examiner

*Primary Examiner*—Eric Hug
(74) *Attorney, Agent, or Firm*—Tarolli, Sundheim, Covell & Tummino LLP

(57) ABSTRACT

A method of treatment of resin impregnated manufactured paper to render the paper fire retardant, said method comprising the addition of a fire retardant compound containing borax and diammonium phosphate introduced into the paper. It is an objective of the invention that the fire retardant system ameliorates any degradation of desirable physical characteristics of the fibrous materials. In particular, the characteristics of wicking and liquid retention should not be unduly degraded when the base material is a "wickable" paper. It is a further objective that the fire retardant systems of embodiments of the present invention not be significantly degraded when the resin treated fibrous material is continuously immersed in running water.

18 Claims, No Drawings

FIRE RETARDANT PAPER

CROSS-REFERENCES TO RELATED APPLICATIONS

The present application claims priority to International Patent Application No.: PCT/AU2004/000967, entitled "FIRE RETARDANT PAPER", having an international filing date of Jul. 16, 2004, which claims priority from AU Patent Application No.: 2003903873 filed Jul. 28, 2003. The entirety of the aforementioned patent applications are incorporated herein by reference for all purposes.

TECHNICAL FIELD

This invention relates to the fire retardant properties of resin impregnated paper.

BACKGROUND ART

Throughout this description and the claims which follow, unless the context requires otherwise, the word "comprise', or variations such as "comprises" or "comprising", will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

Paper consists of a complex web of cellulosic fibres more or less bonded together in a matrix. A characteristic of the fibres and the nature of the matrix holding them together creates the ability to wick and retain liquids within the matrix in such a way that the bulk of the paper becomes wetted some considerable distance from the point of entry of the liquid. This characteristic is undesirable in many applications of paper. Writing and printing paper, for example, needs to have a very low wicking characteristic in order to prevent ink from marking the fibres at any distance from its application thereby retaining clearly and sharply defined lines in only the places where the pen or printing machine has applied the ink.

However, there are other applications wherein the wicking, retaining and replacing of liquid capability of paper is a highly desirable characteristic. An example of such an application is the evaporative media used as evaporative pads in an evaporative air cooler. In this application, the cooling performance of the evaporative cooler is highly dependant on water being distributed throughout the entire matrix of the evaporative pad thereby ensuring that all of the air passing through the evaporative pad comes in contact with only wet surfaces within the pad. Cooling of the air passing through the pad by evaporation of water wetting the pad can only take place on continuously wetted surfaces. Any surface, which is not held in a continuously wet state, will not cool the air impinging on it thereby degrading the overall cooling effect of the cooler.

It is always an objective in the design of an evaporative cooler to distribute water evenly and uniformly throughout the evaporative pad in order to achieve maximum cooling effect on the air passing through. In practical terms, a completely uniform distribution of water is not possible and in any practical device there will always be parts of the evaporative pad not directly wetted. It is always highly desirable that the material from which the evaporative pad is manufactured is able to wick water from the point of application of the water to the general surface area of the material. To meet this objective, paper manufacturers offer paper which is very highly absorbent and capable of wicking liquids over a considerable distance. A related property of such paper is the capability of replacing liquid within the paper matrix. These papers are marketed as "absorbent kraft paper" or similar.

Papers used in the manufacture of such components as evaporative cooler pads must also achieve a long service life under the arduous condition of being continually wetted while in service, and subject to repeated wet and dry cycles. The paper must also withstand the rigours of exposure to sunlight (in particular the ultra-violet light component of sunlight) and extremes of climate. If the evaporative pads, or similar applications, were simply made from the paper as supplied by the paper manufacturer, the service life would be very short before the base paper material disintegrated back to a pulp.

To enhance the service life of these products, the paper is generally treated with a protecting resin which has the effect of protecting the cellulose fibres by encapsulation. It is important to achieve this encapsulation without interfering with the absorbent properties of the porous cellulose fibres. This protection process protects the cellulose from the elements and enhances the physical properties of the final product by making it stronger, more rigid and resistant to long term immersion in water. The resin is required to enhance these properties without degrading the desirable property of the ability to wick liquids. One resin used extensively for this purpose is the thermoset polymer phenyl formaldehyde, although other thermoset polymers may be used. This resin can be applied in a liquid form thereby soaking into the entire matrix of the paper and coating the cellulose fibres therein. The paper can then be processed into any desirable shape, and the resin cured and set rigid by the application of heat. Once cured, the resin surrounds and protects the fibres in the paper thereby allowing the paper to withstand long term immersion in water without degradation of physical properties. The quantity of resin incorporated into the paper must be kept within narrow confines. If too little resin content is present in the paper it is not sufficiently protected. If too much resin, the wicking characteristics of the paper are compromised.

While these methods of treating and processing paper are well known, it is found by practical example that another important characteristic of paper is not enhanced by the treatment with thermoset resin. It is found that the tendency of the paper to burn when subjected to flame or embers is still high when treated within the desired range of resin content, even though most thermoset resins are inherently non-flammable. The retained ability to burn is a by-product of the maintained porosity of the paper with open areas for water transfer. The tendency to burn is most important in some applications of treated papers. In the example above of an evaporative air cooler, an ember lodging within the evaporative pad while the cooler is not in use, and therefore dry, could easily result in the cooler catching fire causing risk to life and property.

It is highly desirable to make the paper treated for use in these applications resistant to fire to avoid these consequences. While there are many well known methods of making paper fire resistant, the arduous operating conditions of the evaporative cooler pad used as an example herein render these methods ineffective. The fire retardant mechanism used must be able to withstand continuous immersion in water for many years without leaching out and thereby becoming ineffective. It must also be non-volatile and not simply dissipate from the paper base in time. The mechanism must also not interfere with the desirable characteristics of wetability and processability of the paper.

One mechanism of rendering paper fire resistant is described by Robinson et al in U.S. Pat. No. 5,723,020 "Fire-retardant saturating kraft paper". The method described by Robinson adds the fire retardant chemicals alumina trihydrate and sodium borate to the paper's cellulose structured web during the manufacturing phase of the paper. While this is an effective method of fire retarding the paper, the method is only available to the manufacturer of the paper since the structure of the cellulose structured web can only be enhanced prior to the processing of the paper pulp into paper. That method is of no use to a manufacturer buying absorbent kraft paper from the general market for conversion into, for example, evaporative pads for evaporative coolers. Furthermore, that method results in paper which no longer has the wicking characteristic required in the application examples cited due to the filling effect on paper porosity of alumina trihydrate.

Lowe and Cabello in GB 901,663 describe a method of manufacture of flame resistant materials for use in the manufacture of laminated plastics. Their method requires the addition of a water soluble inorganic salt to the resin mixture prior to saturation of the base fibre material, and curing of the resin. While effective as a fire retardant, this method does not have any regard to the long term immersion of the resulting product in water. Testing of fire retardants which involve the simple addition of soluble inorganic salts to resin mixtures indicate that the fire retardant chemicals are readily leached out by immersion in water and subsequently when the material is dry the resistance to fire rapidly diminishes.

DISCLOSURE OF INVENTION

It is an objective of the current invention to provide a fire retardant system for the protection of flammable fibrous materials treated with protective resins.

It is an objective of a preferred embodiment of the invention that the fire retardant system ameliorates any degradation of desirable physical characteristics of the fibrous materials. In particular, the characteristics of wicking and liquid retention should not be unduly degraded when the base material is a "wickable" paper.

It is a further objective that the fire retardant systems of embodiments of the present invention not be significantly degraded when the resin treated fibrous material is continuously immersed in running water.

The present invention in one aspect provides a method of treatment of resin impregnated manufactured paper to render the paper fire retardant, said method comprising the addition of a fire retardant compound containing borax and diammonium phosphate introduced into the paper.

In a further preferred form a resin treated fibrous material, which includes the fire retardant system of an embodiment of the present invention, desirably meets the requirements of Underwriters Laboratories, USA, standard UL94 for burn testing of sample material, and the requirements of International Standard IEC335-1. Both of these Standards relate to the fire safety of appliances and/or individual components.

Preferably the fire retardant mixture remains bonded to the resin system and is not displaced by water immersion of the treated paper.

Preferably the fire retardant compound is added with the use of sodium hydroxide as a buffer.

Preferably the pH of the fire retardant compound is held within the range of 8.0-9.0 by means of a sodium hydroxide buffer during addition to the resin, such buffer inhibiting sludge or residue formation during the addition of borax.

Preferably the resin system is introduced to the fire retardant compound before application to the paper thereby enhancing the stability of the fire retardant mixture and resistance to degradation of the paper.

In another aspect the present invention provides a water immersible fire retardant paper, wherein said paper is resin impregnated and includes a fire retardant compound containing borax and diammonium phosphate.

Best Modes

The primary constituent of any kraft paper is cellulose and decomposition and thermal degradation of cellulose at increased temperatures in the presence of water, acids and oxygen will eventually lead to the polymerization of the cellulose molecules and the formation of carbonyl, carboxyl and hydro-peroxide groups. The temperature at which this degradation is likely to occur is approximately 200-300° C., generally resulting in on-going combustion of the paper.

The use of phosphates to assist in increasing the fire-retardant properties of paper is well known and the use of phosphoric acid and its salts, including diammonium phosphate, may react with increased temperatures by forming a link between a phosphate salt molecule in the presence of slightly acidic organic compounds. The addition of a voluble salt, such as borax, assists as a fire-retardant by being susceptible to moisture movement within the base material and migrates in accordance with any movement of this moisture within the product. The mechanism of fire-retardants in the body of the encapsulated kraft paper can be observed and compared to non-retarded product and the decrease in ash and increase in charred areas accounts for the reduction of free volatile and combustible vapours. The fire retardant compounds, including borax and diammonium phosphate, all assist in increasing the residual char apparent and in reducing the generation of ash and totally decomposed material. Kraft paper in the form of evaporative media can be made to demonstrate the fire-retardant properties desired within the product although this does not imply that a totally non-combustible product is produced.

The reaction of diammonium phosphate $(NH_4)_2HPO_4$ at elevated temperatures causes the molecule to lose $NH_3$ to yield monoammonium phosphate. This reaction leads to the dehydration of glucose units from the cellulose chain by the addition of a positively charged particle to the oxygen atom of the hydroxyl group $(OH^-)$, resulting in the formation of the unstable carbonium ion. The carbonium ion rearranges and regenerates a positively charged particle thereby propagating the process and the C—O bond is split to form an intermediate cyclic carbonium cation, which initiates the addition of a water molecule, resulting in a stable end product. The degree of polymerization with a combination of diammonium phosphate and borax reduces the quantity of flammable volatiles produced and enhances the effect of the chain depolymerisation reaction. The de-polymerisation of glucose from the cellulose chain is illustrated below.

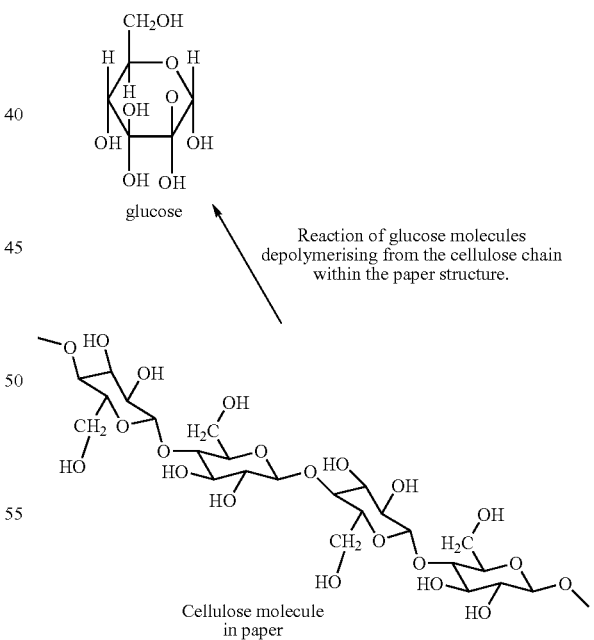

In a particularly preferred embodiment, an absorbent, unbleached kraft paper is introduced to a fire retardant resinous compound containing borax and diammonium phosphate. The resin system is accelerated and stabilised using sodium hydroxide as a solution "buffer". The sodium hydroxide solution enables the pH of the total system to remain at a level greater than 9.0 without any sludge or residue forming during the addition of the borax which would normally tend to lower the pH to a range of 3.0-3.5 due to the formation of acid as the tetraborate complexes with the phenol resin during the mixing process. The stability of the fire-retardant compound is further improved if the resin system is introduced to the fire retardant formulation during component mixing. This will result in a gelatinous compound which is then easily dispersed and dissolved when added to the base resin bath at a rate of approximately 3-6%/volume with vigorous agitation.

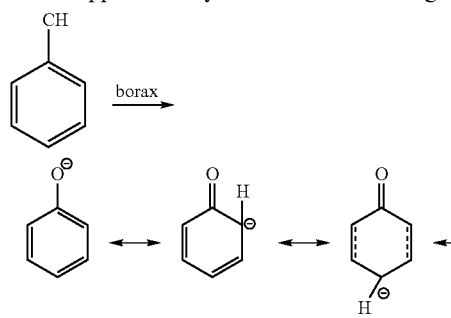

Phenol reacting in an alkaline environment

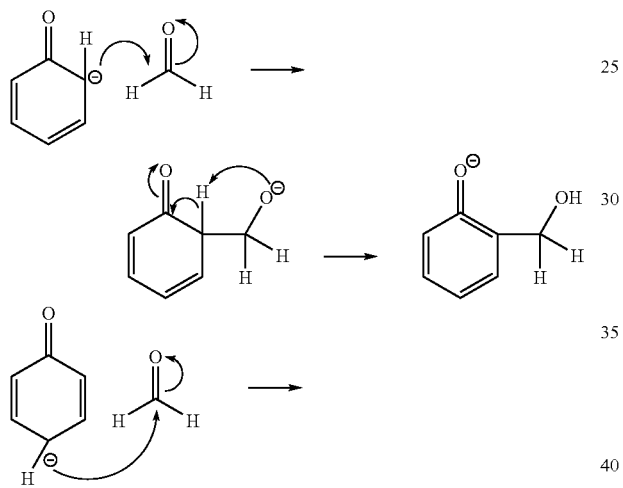

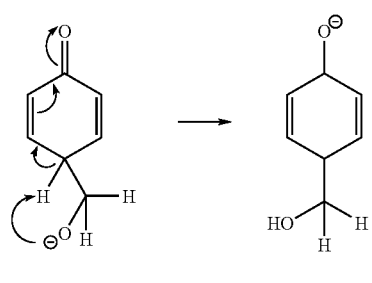

Phenol + Formaldehyde

Further reactions occur, including the linking of the fire-retardant compounds, at this point of the reaction due to the existence of the remaining activated positions at the ortho and para locations.

The reaction forms possible "methylol" compounds, most commonly tri-substituted trimethylolphenol. The formation of trimethylolphenol indicates that the curing reaction is optimised and that a state of complete cure is achievable once the condensation reaction takes place.

Trimethylolphenol formation

The condensation reaction results in an overall increase in temperature of the system and a complete cure of the system at 140° C.-150° C. for approximately 5 minutes is sufficient to accomplish optimization of all initiated reactions.

Total reaction (minus $H_2O$) results in the formation of fully cured Phenol Formaldehyde Resin.

The addition of the hydroxyl ions introduced during pH adjustment with sodium hydroxide benefits the bonding of the fire-retardant components and the curing rate and final efficiency of the cross linking process. The total efficiency is a measure of the ability to form trimethylolphenol.

Absorbent kraft paper treated with impregnating resins combined with the fire retardant chemicals applied using the systems of the described embodiment have been demonstrated to provide effective retardation of the propagation of fire within the paper relative to resin impregnated paper not so treated with fire retardants. Since the fire retardant system has been chemically bonded within the impregnating resins, there is little or no tendency for the fire retardants to leach out under prolonged immersion in water. The essential mechanism of impregnating and protecting the paper has not changed by the use of the systems of the described embodiment, thereby ensuring that the desired physical properties of the impregnated paper, which includes the preferred fire retardant system of this invention, is essentially no different from the impregnated paper prior to the addition of the fire retardant system.

While the basic mechanism of fire retardation within the impregnated paper can be readily demonstrated, optimisation of the materials and method of manufacture requires considerable experimentation and testing.

The current invention when applied to paper materials results in the fire retardant properties of the paper being greatly enhanced without degradation of desirable characteristics including the tendency to wick and absorb liquids. When the invention is applied as herein described, the fire retardant properties of the paper so treated are not degraded by immersion in water.

The invention claimed is:

1. A method of producing an immersible fire retardant paper, the method comprising the steps of:
    adding a fire retardant compound to a resin to form a partial mixture, the fire retardant compound comprising borax and diammonium phosphate and said resin being part of a base resin bath;
    maintaining the pH of said partial mixture at a prescribed level by adding a solution buffer containing sodium hydroxide to form a stabilized partial mixture;
    mixing said fire retardant compound and said solution buffer with said resin;
    adding the remaining resin to said stabilized partial mixture to form a fire retardant resinous compound; and
    impregnating a kraft paper with said fire retardant resinous compound to produce said immersible fire retardant paper.

2. The method of claim 1 wherein said fire retardant compound is added to said resin during component mixing.

3. The method of claim 1 wherein the pH of said partial mixture is maintained at a level greater than 9.0.

4. The method of claim 2 wherein addition of the solution buffer and the fire retardant compound produces a gelatinous compound.

5. The method of claim 4 further comprising the step of adding the gelatinous compound to the base resin bath.

6. The method of claim 5 wherein the gelatinous compound is added at a rate of about 3-6%/volume and with vigorous agitation.

7. The method of claim 6 wherein a condensation reaction takes place to form trimethylolphenol.

8. The method of claim 7 wherein the resin system is cured at a temperature of about 140° C. to about 150° C. for about 5 minutes.

9. The method of claim 8 wherein the cured resin system results in the formation of phenol formaldehyde resin.

10. A method of producing an immersible fire retardant paper, the method comprising the steps of:
    adding a fire retardant compound to a resin to form a partial mixture, the fire retardant compound comprising borax and diammonium phosphate and said resin being part of a base resin bath;
    maintaining the pH of said partial mixture at a level greater than 9.0 by adding a solution buffer containing sodium hydroxide to form a stabilized partial mixture;
    mixing said fire retardant compound and said solution buffer with said resin;
    adding the remaining resin to said stabilized partial mixture to form a fire retardant resinous compound; and
    impregnating a kraft paper with said fire retardant resinous compound to produce said immersible fire retardant paper;
    wherein said fire retardant compound is added to said resin during component mixing.

11. The method of claim 10 wherein addition of the solution buffer and the fire retardant compound produces a gelatinous compound.

12. The method of claim 11 further comprising the step of adding the gelatinous compound to the base resin bath.

13. The method of claim 12 wherein the gelatinous compound is added at a rate of about 3-6%/volume and with vigorous agitation.

14. The method of claim 13 wherein a condensation reaction takes place to form trimethylolphenol.

15. The method of claim 14 wherein the resin system is cured at a temperature of about 140° C. to about 150° C. for about 5 minutes.

16. The method of claim 15 wherein the cured resin system results in the formation of phenol formaldehyde resin.

17. A method of producing an immersible fire retardant paper, the method comprising the steps of:
    adding a fire retardant compound to a resin to form a partial mixture, the fire retardant compound comprising borax and diammonium phosphate and said resin being part of a base resin bath;
    maintaining the pH of said partial mixture at a level greater than 9.0 by adding a solution buffer containing sodium hydroxide to form a stabilized partial mixture;
    mixing said fire retardant compound and said solution buffer with said resin;
    wherein said fire retardant compound is added to said resin during component mixing to produce a gelatinous compound;
    adding the gelatinous compound to the base resin bath to form a fire retardant resinous compound;
    impregnating a kraft paper with said fire retardant resinous compound; and
    subjecting the impregnated kraft paper to a temperature of about 140° C. to about 150° C. for a time sufficient to cure the resin.

18. The method of claim 17 wherein the cured resin system includes the formation of phenol formaldehyde resin.

* * * * *